US008554211B2

(12) United States Patent
Angelow et al.

(10) Patent No.: US 8,554,211 B2
(45) Date of Patent: Oct. 8, 2013

(54) METHOD, APPARATUS, AND COMPUTER PROGRAM PRODUCT FOR SIGNALING ALLOCATION OF NEIGHBOR CELLS

(75) Inventors: Iwajlo Angelow, Wroclaw (PL); Mieszko Chmiel, Glucholazy (PL); Jörn Krause, Berlin (DE); Samuli Visuri, Helsinki (FI)

(73) Assignee: Nokia Corporation, Espoo (FI)

( * ) Notice: Subject to any disclaimer, the term of this patent is extended or adjusted under 35 U.S.C. 154(b) by 1065 days.

(21) Appl. No.: 12/151,011

(22) Filed: May 2, 2008

(65) Prior Publication Data

US 2009/0156225 A1 Jun. 18, 2009

Related U.S. Application Data

(60) Provisional application No. 60/927,362, filed on May 2, 2007.

(51) Int. Cl.
*H04W 4/00* (2009.01)

(52) U.S. Cl.
USPC ........ 455/434; 455/450; 455/451; 455/452.1; 455/452.2

(58) Field of Classification Search
USPC ....................................... 455/434, 450–452.2
See application file for complete search history.

(56) References Cited

U.S. PATENT DOCUMENTS

| 6,522,670 | B1 | 2/2003 | Jokinen et al. | |
| 2003/0007498 | A1 | 1/2003 | Angle et al. | 370/414 |
| 2003/0026242 | A1 | 2/2003 | Jokinen et al. | 370/350 |
| 2003/0134622 | A1 | 7/2003 | Hsu et al. | 455/414 |
| 2005/0036475 | A1* | 2/2005 | Nishiyama et al. | 370/347 |
| 2005/0192060 | A1* | 9/2005 | Rudolf | 455/562.1 |
| 2005/0245262 | A1 | 11/2005 | Moon et al. | 455/436 |
| 2006/0009246 | A1* | 1/2006 | Marinier et al. | 455/502 |
| 2006/0083211 | A1* | 4/2006 | Laroia et al. | 370/343 |
| 2006/0251019 | A1 | 11/2006 | Dalsgaard et al. | |
| 2008/0014958 | A1* | 1/2008 | Kim et al. | 455/452.2 |

FOREIGN PATENT DOCUMENTS

| CN | 1267439 A | 9/2000 |
| CN | 1574676 A | 2/2005 |
| CN | 1878391 A | 12/2006 |
| CN | 101044768 A | 9/2007 |
| EP | 0 866 453 A2 | 12/1998 |
| EP | 1 467 586 A2 | 10/2004 |

(Continued)

OTHER PUBLICATIONS

3GPP TR 25.813 v0.1.0 (Nov. 2005); 3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7).

(Continued)

*Primary Examiner* — Charles Appiah
*Assistant Examiner* — Jaime Holliday
(74) *Attorney, Agent, or Firm* — Mintz, Levin, Cohn, Ferris, Glovsky and Popeo, P.C.

(57) ABSTRACT

A method, user equipment, network device, and software product employ indicators from a plurality of respective cells to indicate a difference, if any, regarding allocation in the respective cell as compared to neighbor cells. Mobility measurements are then performed according to the indicators, and also on the basis of configuration of a cell where the measurements are performed.

22 Claims, 7 Drawing Sheets

(56) References Cited

FOREIGN PATENT DOCUMENTS

| | | |
|---|---|---|
| JP | 2005-516474 | 6/2005 |
| JP | 2005-318309 | 11/2005 |
| WO | WO 00/36853 | 6/2000 |
| WO | WO-2006017024 | 2/2006 |

OTHER PUBLICATIONS

3GPP TR 25.913 v7.2.0 (Dec. 2005); 3rd Generation Partnership Project; Technical Specification Group Radio Access Network; Requirements for Evolved UTRA (E-UTRA) and Evolved UTRAN (E-UTRAN) (Release 7).

3GPP TS 36.211 v1.0.0 (Mar. 2007); 3rd Generation Partnership Project; Technical Specification Group Radio Access Network; Physical Channels and Modulation (Release 8).

3GPP TSG-RAN WG2 Meeting #56bis, "Neighbouring Cell Information", Samsung, Sorrento, Italy, Jan. 15-19, 2007 (R2-070167).

3GPP TSG-RAN1 Meeting #48bis, Malta, Mar. 26-30, 2007, Change Request (R1-071729). (3GPP TS 25.221 v7.1.0 (Sep. 2006).

Korean Intellectual Property Office; S. Moon; "Non-Final Rejection"; whole document (with English translation); Mar. 24, 2011.

3GPP TSG-RAN WG1 #49, Tdoc R1-072282; "Mobility and CQI Measurements in Mixed Unicast/MBSFN Carriers"; May 7-11, 2007; pp. 1-3; Kobe, Japan.

3GPP TSG-RAN WG2 Meeting #56bis, "Neighbouring Cell Information", Samsung, Sorrento, Italy, Jan. 15-19, 2007.

Translation of Office Action dated Jun. 5, 2012, issued by the Russian Patent Office, in connection with counterpart Russian patent application No. 2009144486/07.

Nevdyaev L.M., *Telekommunikatsionnie Tekhnologii* (*Telecommunication Technologies. English-Russian Dictionary*, Moscow, 2002, p. 166, 333).

\* cited by examiner

METHOD, APPARATUS, AND COMPUTER PROGRAM PRODUCT FOR SIGNALING ALLOCATION OF NEIGHBOR CELLS

CROSS REFERENCE TO RELATED APPLICATION

This application claims priority to U.S. Provisional Application 60/927,362 filed 2 May 2007.

FIELD OF THE INVENTION

The invention relates to the field of wireless telecommunications. More particularly, the present invention pertains to cell allocation.

BACKGROUND OF THE INVENTION

The telecommunications industry is in the process of developing a new generation of flexible and affordable communications that includes high-speed access while also supporting broadband services. Many features of the third generation (3G) mobile telecommunications system have already been established, but many other features have yet to be perfected.

One of the systems within the third generation of mobile communications is the Universal Mobile Telecommunications System (UMTS) which delivers voice, data, multimedia, and wideband information to stationary as well as mobile customers. As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

Evolved UTRAN (EUTRAN) is meant to take 3G even farther into the future. EUTRAN is designed to improve the UMTS mobile phone standard in order to cope with various anticipated requirements. EUTRAN is frequently indicated by the term Long Term Evolution (LTE), and is also associated with terms like System Architecture Evolution (SAE).

Information about LTE can be found in 3GPP TR 25.913 (V7.2.0, December, 2005), *Requirements for Evolved UTRA (E-UTRA) and Evolved UTRAN* and also in 3GPP TR 25.813 (V0.1.0, November 2005), *Evolved UTRA and UTRAN—Radio interface protocol aspects*, both of which are incorporated herein by reference in their entirety. UTRAN and EUTRAN will now be described in some further detail.

The UTRAN consists of a set of Radio Network Subsystems 128 (RNS), each of which has geographic coverage of a number of cells 110 (C), as can be seen in FIG. 1. The interface between the subsystems is called Iur. Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

In UMTS radio networks, a UE can support multiple applications of different qualities of service running simultaneously. In the MAC layer, multiple logical channels can be multiplexed to a single transport channel. The transport channel can define how traffic from logical channels is processed and sent to the physical layer. The basic data unit exchanged between MAC and physical layer is called the Transport Block (TB). It is composed of an RLC PDU and a MAC header. During a period of time called the transmission time interval (TTI), several transport blocks and some other parameters are delivered to the physical layer.

Generally speaking, a prefix of the letter "E" in upper or lower case signifies the Long Term Evolution (LTE). The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

An example of the E-UTRAN architecture is illustrated in FIG. 2. This example of E-UTRAN consists of eNBs, providing the E-UTRA user plane (RLC/MAC/PHY) and control plane (RRC) protocol terminations towards the UE. The eNBs are connected by means of the S1 interface to the EPC (evolved packet core), more specifically to the Mobility Management Entity (MME). The S1 interface supports a many-to-many relation between MMEs and eNBs. The MME in the example of FIG. 2 is one option for the access gateway (aGW).

In this example of E-UTRAN, there exists an X2 interface between the eNBs that need to communicate with each other. The eNB may host functions such as radio resource management (radio bearer control, radio admission control, connection mobility control, dynamic allocation of resources to UEs in both uplink and downlink), selection of a mobility management entity (MME) at UE attachment, scheduling and transmission of paging messages (originated from the MME), scheduling and transmission of broadcast information (originated from the MME or O&M), and measurement and measurement reporting configuration for mobility and scheduling. The MME may host functions such as the following: distribution of paging messages to the eNBs, security control, IP header compression and encryption of user data streams; termination of U-plane packets for paging reasons; switching of U-plane for support of UE mobility, idle state mobility control, System Architecture Evolution (SAE) bearer control, and ciphering and integrity protection of NAS signaling.

According to recent developments in this field, the user equipment (UE) can measure any reference signal (RS) from a first antenna (#1) and a second antenna (#2), with the exact pilot/frame structure given in 3GPP TS 36.211 V. 1.0.0 (2007 March) *Physical Channels and Modulation (Release 8)* which is incorporated herein by reference in its entirety. Orthogonal Frequency Division Multiplexing (OFDM) symbols bearing this reference signal (RS) occur 4 times per unicast sub-frame and only once in Multicast Broadcast Single Frequency Network (MBSFN) sub-frames. The accuracy and reliability of mobility measurements depends on the number of RS resource elements eligible for measurements, and on the UE awareness of presence or absence of some RS resource elements (e.g. in MBSFN sub-frames). These mobility measurements have to be carried out on RS resource elements of the cell on which the UE is camping on, as well as on corresponding neighbor cells.

Various solutions to this problem have been attempted. For example, one technique is to signal full MBSFN sub-frame allocation of a cell on this cell's primary Broadcast Channel (P-BCH). However, that technique is very costly from the overhead point of view, because the P-BCH is a very robust channel and each P-BCH bit consumes a non-negligible part of a cell's capacity. Furthermore, for measuring RS from neighbor cells, this requires that the P-BCH from neighbor cells be received before and during measurements which might be unreliable and adds extra complexity.

A second technique is to measure the RS only in the first OFDM symbol of each sub-frame. However, according to that technique, the number of RS elements eligible for measurements is always reduced by a factor of 4, which will incur measurement inaccuracy.

A third technique is to signal a per carrier MBSFN/non-MBSFN indication. Therefore, in the MBSFN case, only the first RS OFDM symbol of each sub-frame would be used (see second technique described above), and in the non-MBSFN case up to 4 RS OFDM symbols could be used. This means that in the latter case all available and eligible RS elements can be measured in unicast carriers. However, according to this third technique, the number of RS elements eligible for measurements is reduced by a factor of 4 in any mixed MBSFN/unicast carrier (including carriers where the MBSFN area includes only a couple of cells or including carrier-wide MBSFN area(s)).

SUMMARY OF THE INVENTION

Although the present invention is applicable in the context of the LTE, its principles are not limited to LTE, and instead may also be applicable to various other current and future wireless telecommunications systems. Throughout this application, the general term "base station" will be understood to include an eNB, a Node B, or any other network element that serves a purpose analogous to a base station of the UTRAN.

This invention is related to the standardized Long Term Evolution of 3GPP. More specifically it considers mobility measurements taking into account the possibility to multiplex unicast and multicast/broadcast traffic within one frequency carrier.

According to recent developments in this field, time division multiplexing (TDM) of Multimedia Broadcast Multimedia Services (MBMS) and unicasting of data channel (Physical Downlink Shared Channel PDSCH) are done on a sub-frame basis. The unicast control channel (Physical Downlink Control Channel or PDCCH) together with downlink unicast pilot (cell specific RS) can be TDM multiplexed with MBSFN in the same sub-frame (so-called MBSFN sub-frame) in case of a mixed MBSFN or unicast carrier. In such MBSFN sub-frames, the PDCCH (with cell-specific pilot) is transmitted in the first, or in the first two, OFDM symbols and MBSFN (multi-cell traffic and pilot) is transmitted in the rest of the sub-frame's OFDM symbols. Furthermore, according to recent developments, MBSFN should not be transmitted in sub-frame #0 and #5 (i.e. Synchronization Channel or SCH sub-frames), so that UE can confidently use cell-specific RS at least in these sub-frames for measurements.

MBSFN symbols in MBSFN sub-frames can also contain cell common pilots but they cannot be used for unicast handover measurements.

Providing full information regarding MBSFN or unicast sub-frame allocation in neighbor cells via own cell would be costly from the overhead or signaling point of view. The present invention therefore includes an efficient method to provide information about MBSFN or unicast allocation in neighbor cells, and to maximize the accuracy of mobility-related neighbor cell measurements by maximizing the number of RS resource elements eligible for UE mobility measurements of neighbor cells.

According to the present invention, each cell transmits an indicator (preferably only one bit) of the difference in unicast or MBSFN sub-frame allocation between the own cell and neighbor cells. The indicator is broadcast on a common channel preferably a broadcast control channel. The indicator is set and signals whether unicast or MBSFN allocation in neighbor cells is the same or not compared to the own cell.

It should be noted that unicast or MBSFN allocation in many scenarios will be the same in the own cell and in neighbor cells. These scenarios include: Unicast carriers (and MBSFN dedicated carriers), Unicast/MBSFN carriers with PLMN-wide MBSFN area(s), non-PLMN-wide MBSFN area(s) deployed over large geographical regions in unicast/MBSFN carriers, and Unicast areas in unicast/MBSFN carriers with non-PLMN-wide MBSFN deployments (PLMN stands for Public Land Mobile Network). In addition, inter-node signaling can be used to automate setting of the indicator.

DETAILED DESCRIPTION OF THE INVENTION

A preferred embodiment of the present invention will now be described. This is merely to illustrate one way of implementing the invention, without limiting the scope or coverage of what is described elsewhere in this application.

Figure 1:
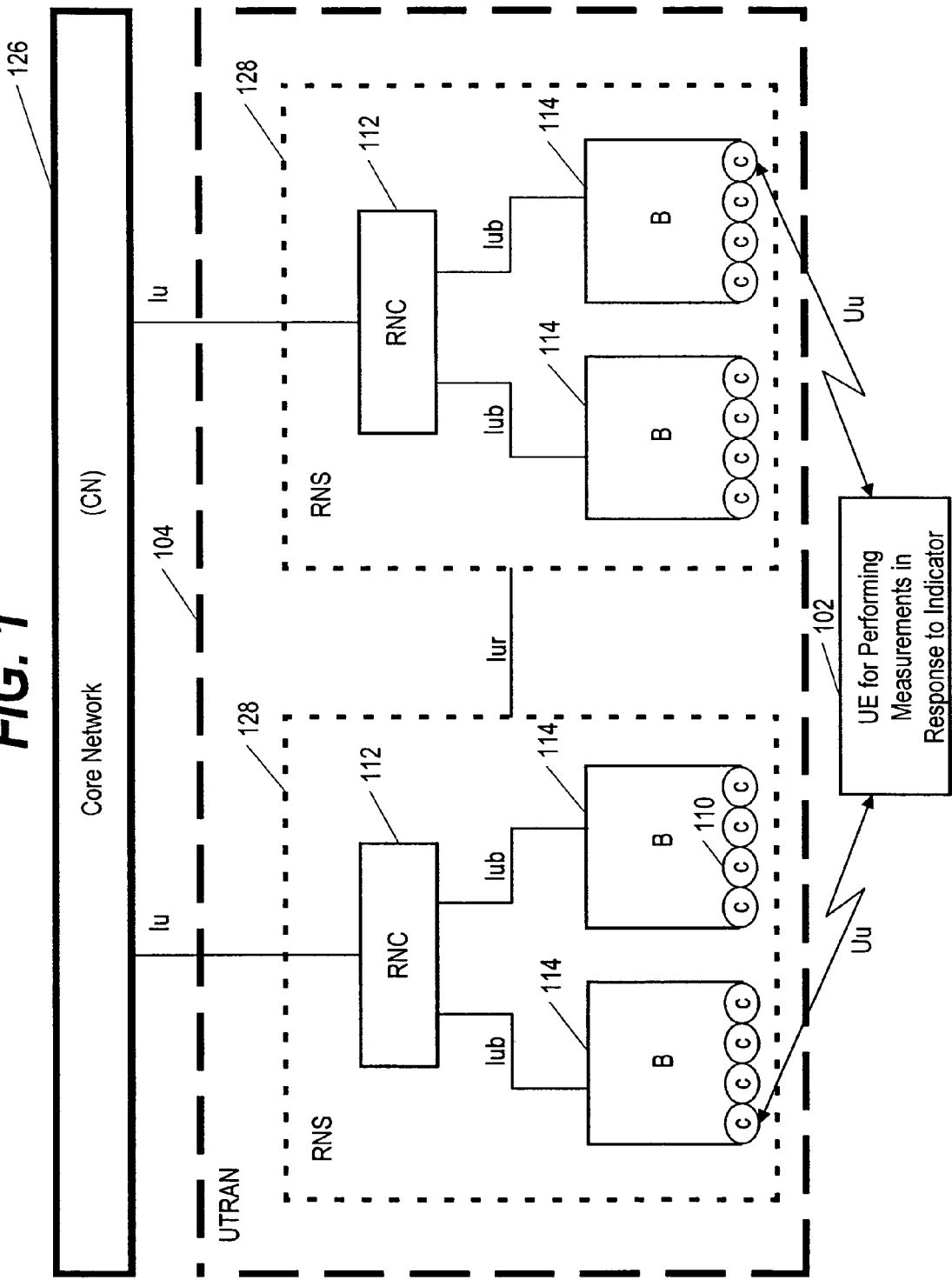
FIG. 1 shows a UTRAN network.
Figure 2:
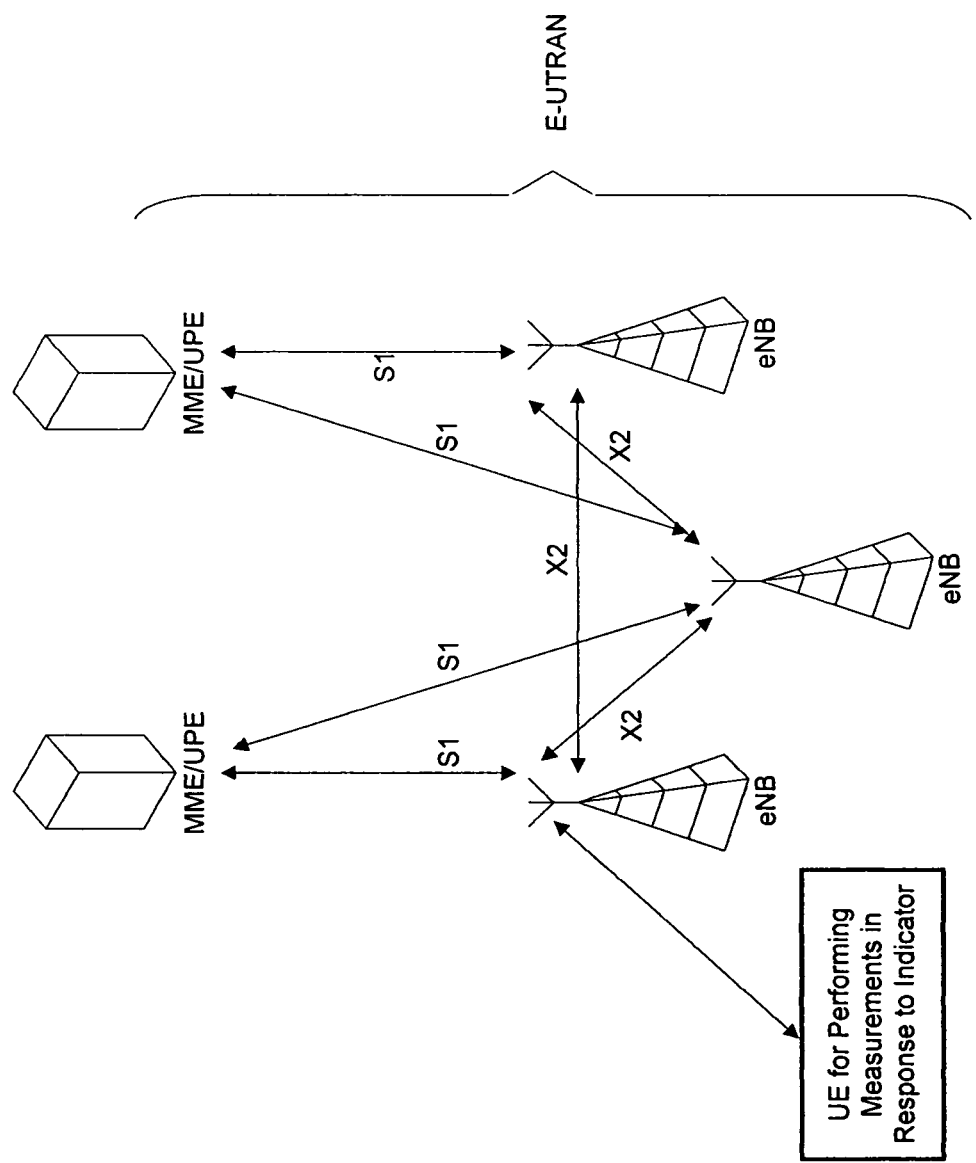
FIG. 2 shows an LTE architecture.
Figure 3:
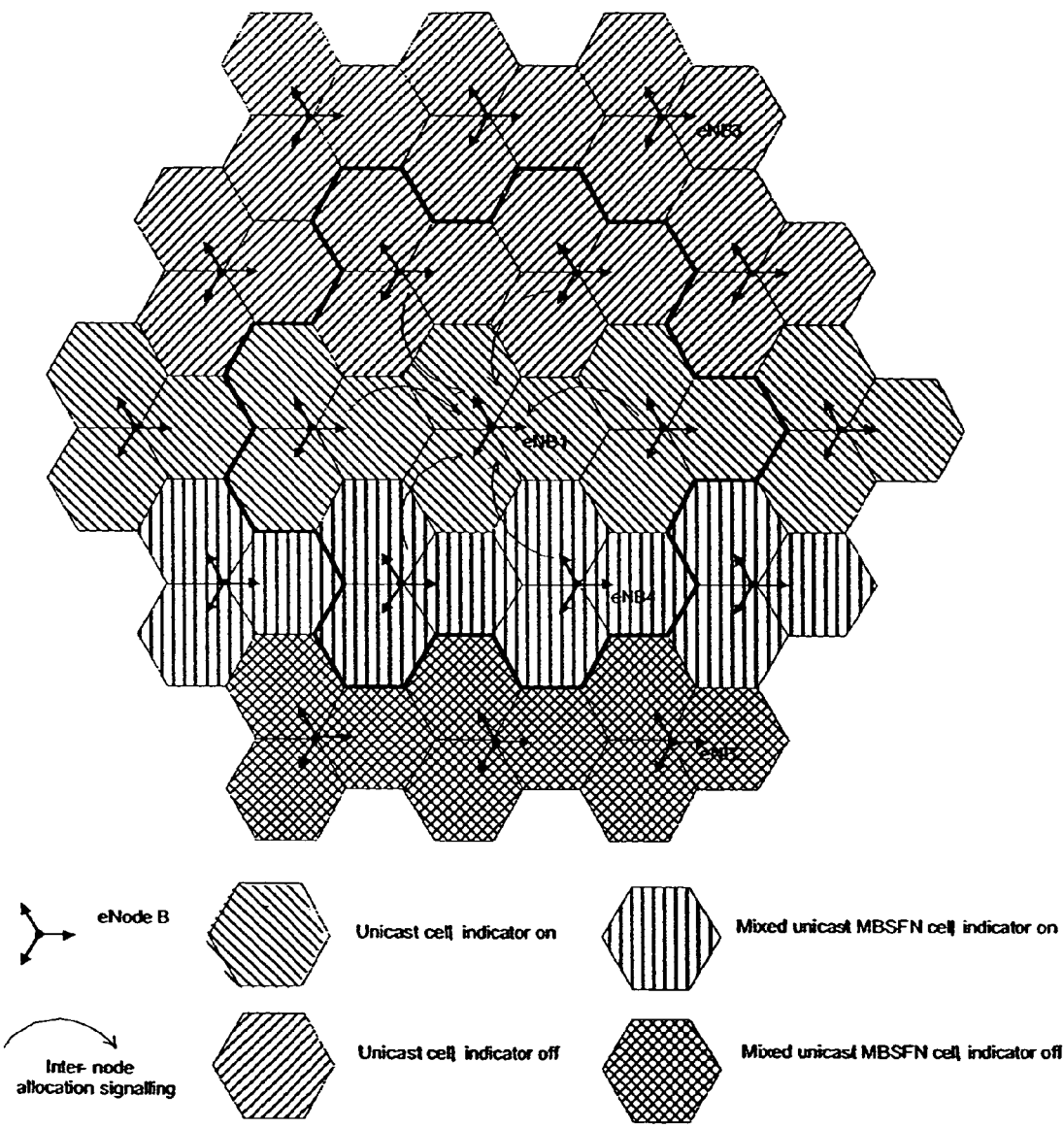
FIG. 3 where the indicator would be the same for all cells of a Node B: neighbor cells of Node B 1 have different unicast or MBSFN allocations.
Figure 4:
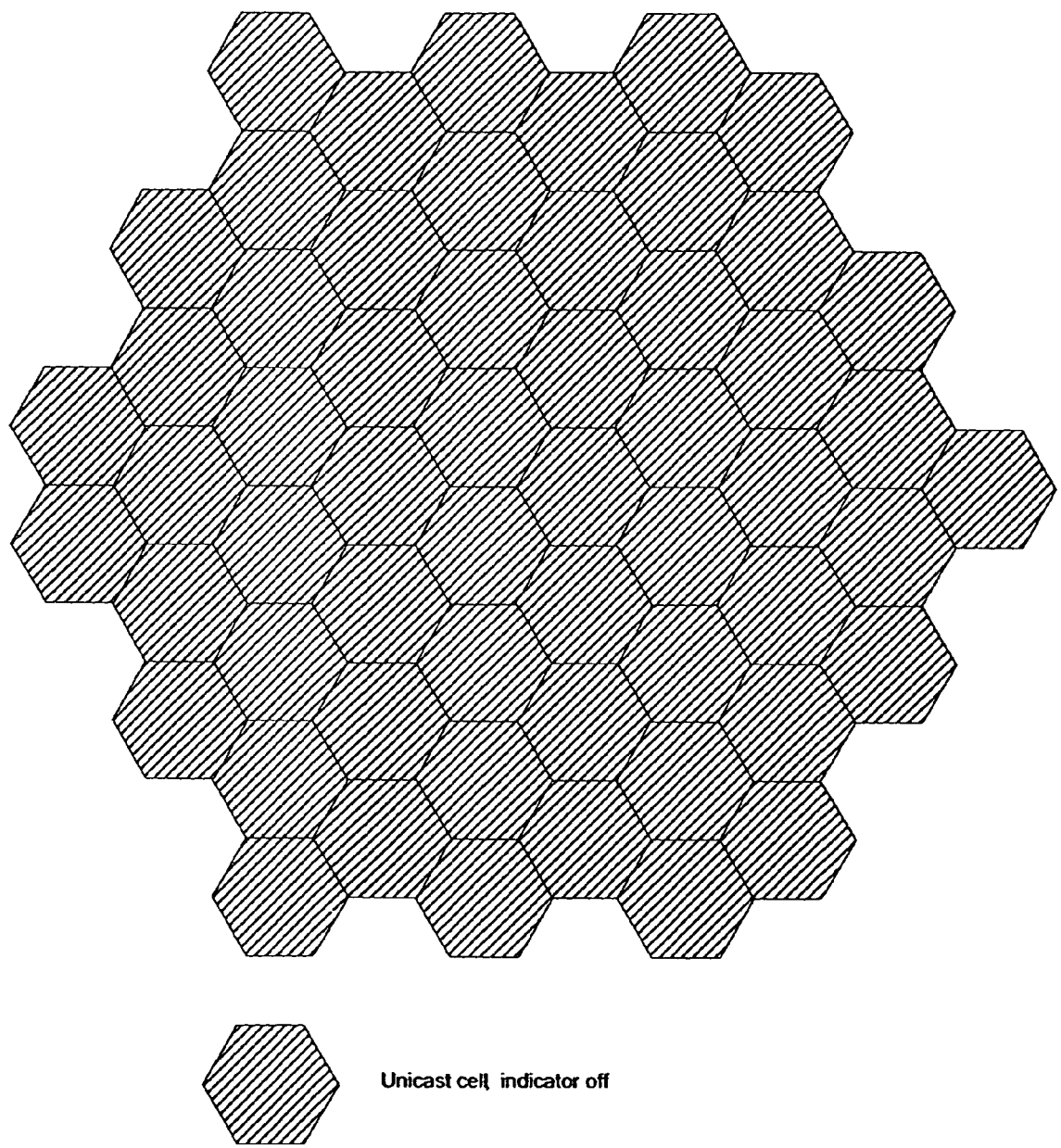
FIG. 4 presents the case when all cells are unicast, the indicator is off.
Figure 5:
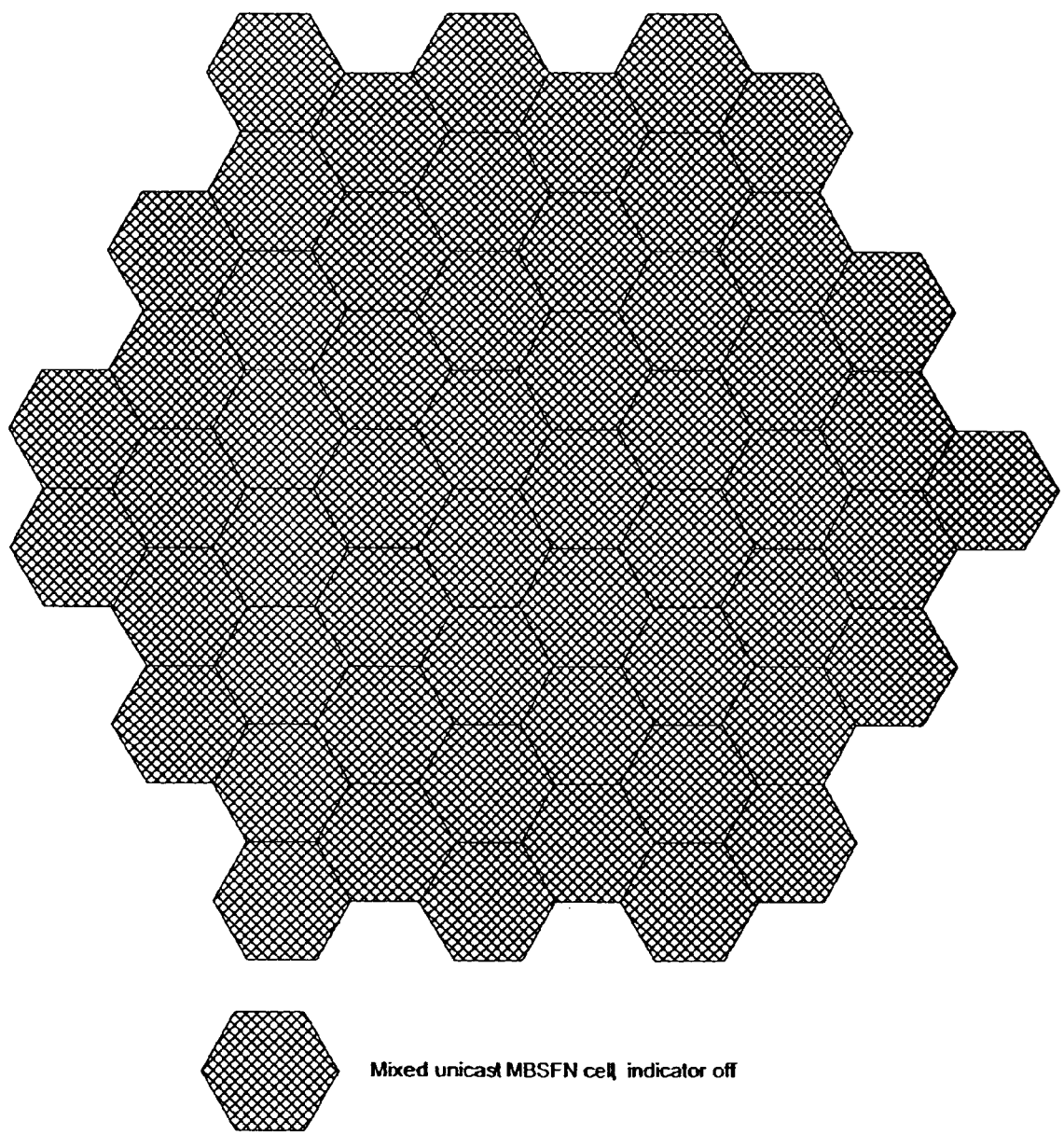
FIG. 5 presents the case when all cells are mixed unicast or MBSFN and have the same unicast or MBSFN allocation (i.e. the cell belong to the same MBSFN area(s)) so the indicator is off.

As mentioned, each cell transmits an indicator (preferably only one bit) of the difference in unicast or MBSFN sub-frame allocation between the own cell and neighbor cells. The indicator is broadcast on a common channel, preferably a dynamic broadcast channel. The indicator is set and signals whether unicast or MBSFN allocation in neighbor cells is the same or not compared to the own cell An example of the present invention is shown in FIG. 3, where the indicator would be the same for all cells of a Node B: neighbor cells of Node B 1 have different unicast or MBSFN allocations. In consequence, the indicator broadcasted in the cells of Node B 1 is on. Node B 1 is aware of MBSFN or unicast allocation in cells of the group of (6) surrounding Node Bs (marked by bold line). Neighbor cells of Node B 2 have the same MBSFN or unicast allocations, and therefore the indicator in the cells of Node B 2 is off (same for Node B 3). The criss-cross pattern in FIG. 3 indicates an MBSFN area. Observe that the indicator in eNode B 4 can also be set off, in case the MBSFN sub-frames location in neighbor cells of this Node B is a sub-set of the MBSFN sub-frames in eNode B 4 i.e. the UEs in cells of Node 4 know that surrounding cells transmit the same or more unicast sub-frames If the indicator is set to a first value, e.g. "0" (e.g. unicast carrier c.f. FIG. 4, interior of MBSFN area(s) c.f. FIG. 5), this means that unicast or MBSFN allocation (i.e. the location of MBSFN and/or unicast sub-frames) in neighbor cells is the same as in the own cell. The UE action will be such that the UE can use the RS resource elements eligible for the Reference Signal Received Power (RSRP) measurements of neighbor cells corresponding to the ones used for measurements in the own cell. The eligible RS resource elements in neighbor cells are derived on the basis of the unicast/MBSFN allocation of the own cell However, if the indicator is set to a second value e.g. "1" (e.g. border of MBSFN area(s) c.f. FIG. 3), this means that a unicast or MBSFN allocation in neighbor cells is different comparing to the own cell. The UE action will be such that the UE falls back to measure neighbor cells using only the RS resource elements in the first OFDM symbol in each sub-frame together with all RS resource elements in SCH-sub-frames (regardless of the fact if the UE is aware of the cyclic prefix length in these first OFDM symbols)

Furthermore, there may be inter-node signaling so that each cell/eNode B can determine if MBSFN/unicast allocation in its neighbor cells/Node Bs is the same or not and set the indicator value automatically. This signaling can be between neighbor eNode Bs (the X2 interface) and would exchange the information regarding each others MBSFN/unicast allocations. Also, this signaling can be between a master node (e.g. Multi-cell Coordination Entity) and groups of neighbor eNode Bs to inform Node Bs/cells if the MBSFN/unicast allocation in neighbor cells is the same or not (alternatively informing about the exact MBSFN/unicast allocation of neighbor cells/eNode Bs).

From the inter-cell power control point of view, there must be a notion of neighbor cells (detectable and measured by serving UEs) exchanging overload indicators over the X2 interface. Therefore, it may be beneficial and simple if the same group can be used to define neighbor cells being aware of each other MBSFN/unicast allocation.

Prior to Dynamic Broadcast Channel (D-BCH) or MBMS Control Channel (MCCH) reception, the UE might be not aware of the MBSFN/unicast allocation in the own cell e.g. during initial cell search. In consequence inter-sub-frame channel estimation for D-BCH demodulation might be constrained. Therefore, it might be beneficial not to constrain inter-sub-frame channel estimation by placing the D-BCH adjacently to unicast sub-frames (e.g. SCH sub-frames).

Advantages of the above preferred embodiment include low overhead, and no need to constantly read the Broadcast Channel of neighbor cells during measurements. Furthermore, the number of RS resource elements eligible for mobility measurements of neighbor cells is increased in typical deployment scenarios (this increases the measurement accuracy and decrease the number of erroneous handovers and cell reselections). Also, the indicators in each cell can be set automatically if inter-node signaling of MBSFN/unicast allocation is specified (alternatively setting of the indicators can be operator or implementation-specific). Additionally, there is no need to additionally define groups of neighbor cells or Node Bs if the groups of Node Bs or cells exchanging overload indicators over the X2 interface for inter-cell power control are reused (alternatively the definition of groups can be operator/implementation-specific).

Alternatively, if some UEs are not aware of MBSFN or unicast allocation in the own cell the following solution can be adopted: the indicator can take more than two values/states (e.g. 2 bits). Two values are used by the UEs being aware of MBSFN or unicast allocation as described in the preferred implementation, the remaining two values are used to signal to the UEs being not aware of MBSFN or unicast allocation in the own cell whether neighbor cells are unicast or mixed MBSFN or unicast cells.

The signaling between the eNode B and the UE will have to be specified and implemented in the eNode B and in the UE. Furthermore, the interpretation of the signaling and relevant behaviour will be implemented in the UE. Finally, also corresponding eNode B to eNode B signaling or an information exchange involving a central node will be needed.

The present invention includes a cellular mobile communication system (e.g. LTE) in which base stations (e.g. eNode Bs) provide a beacon signal (e.g. reference signal) for mobile stations (e.g. UEs) in their cells and in which this beacon signal is provided in specific time periods (e.g. reference signal symbols), i.e. not continuously and there are at least 2 phases: phase A (e.g. a unicast sub-frame) in which beacon signals are provided N times (e.g. N=4) over time interval A at fixed locations; and phase B (e.g. MBMS sub-frame) in which beacon signals are provided M times (e.g. M=1) over time interval B at fixed locations.

Each cell can either operate in phase A only, in phase B only, or in a combination of phases A and B for which it is cell-specific how many phases A and how many phases B follow each other. The present invention considers such a system and provides a means for mobile stations to carry out measurements of these beacons in the serving (own) and the neighbor cells by: exchange of cell specific lists of the sequences of phases A and B used for a determined time period; exchange of these lists between neighbor cells/base stations via network interfaces; providing of corresponding information to the UEs by its serving cell so that these UEs know when to measure which beacon signal of own and neighbor cells.

The present invention also includes modifications of the system just described. The system may be such that the M time positions form a subset of the N time positions. Also, the system may be such that cells are synchronized or the UE knows the cell timing (e.g. via reading the synchronization channel).

The present invention also includes either of the systems just described, for which the "corresponding information" is provided in a form of a complete or reduced list for serving and neighbor cells (e.g. cell 1: x times phase A, y times phase B; cell 2: q times phase A, r times phase B; cell 3: u times phase B, v times cell A, w times phase B; or e.g. reduced: xA, yB/qA, rB/uB, vA, WB), or as a list only from the serving cell either in a broadcast manner (e.g on BCH) or in mobile station specific way.

The present invention also includes the systems just described, for which the "corresponding information" is provided for the serving cell in the form of a list from the serving cell either in a broadcast manner (e.g on BCH) or in mobile station specific way, or is provided for all predefined neighbor cells in a form of an indicator sent from the serving cell which indicates whether the serving cell is using the same phase A/phase B setting as a predefined set of neighbor cells or not. This indicator could be one indicator per neighbor cell or one indicator for all cells.

The present invention also includes the systems just described, for which the M time positions form a subset of the N time positions, so that if the indicator indicates that the setting of a neighbor cell is different from the serving cell the UE could measure at least on the subset of beacon signals.

If a base station is controlling all its cells in the same way with respect to the sequence of phases A and B, then the considerations related to the various systems just described could also be implemented per serving and neighbor base station instead of per serving cell and neighbor cell.

Figure 6:
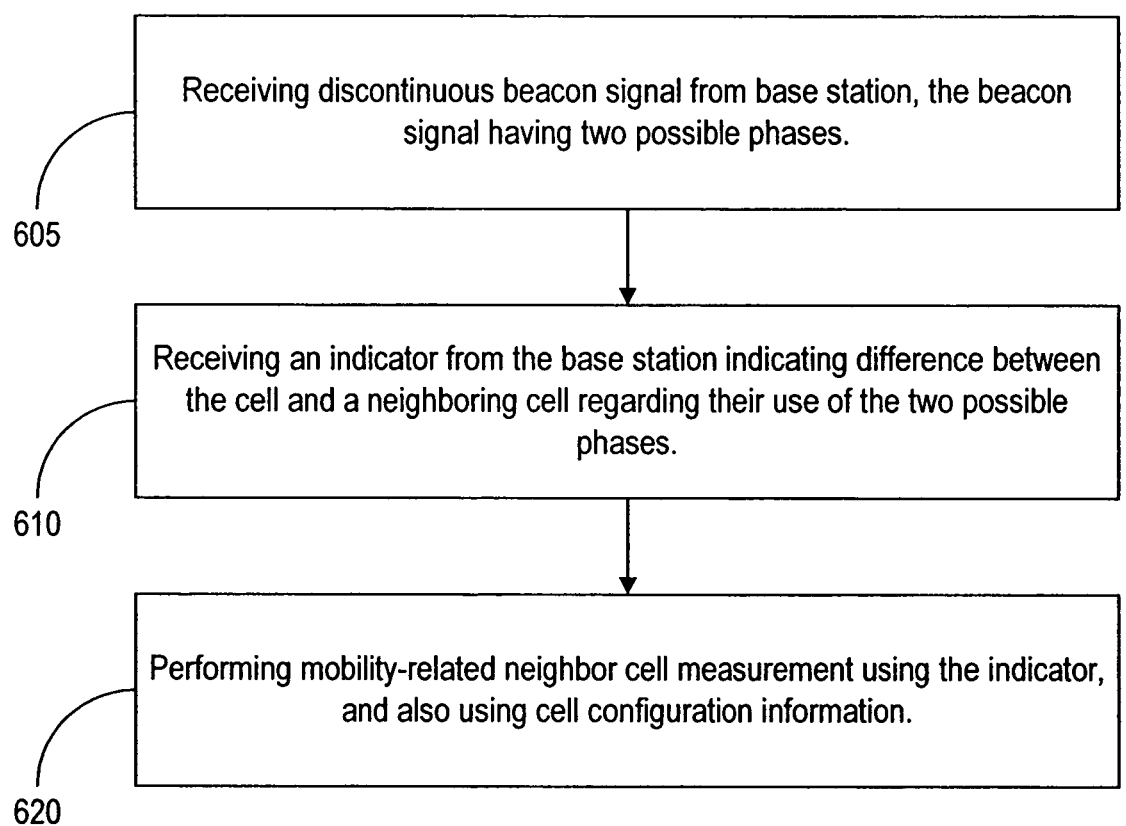
FIG. 6 is a flow chart showing a method according to a embodiment of the present invention.

As seen in FIG. 6, one method 1600 of the present invention begins by receiving 605 a discontinuous beacon signal from a base station, the beacon signal having two possible phases. This occurs at a plurality of base stations. Then an indicator is received 610 from the base station, indicating the difference at the bases station's cell, as compared to neighboring cells, regarding each cell's use of the two possible phases. Subsequently, mobility-related neighbor cell measurement is performed 620 using the indicator, and also using cell configuration information.

Figure 7:
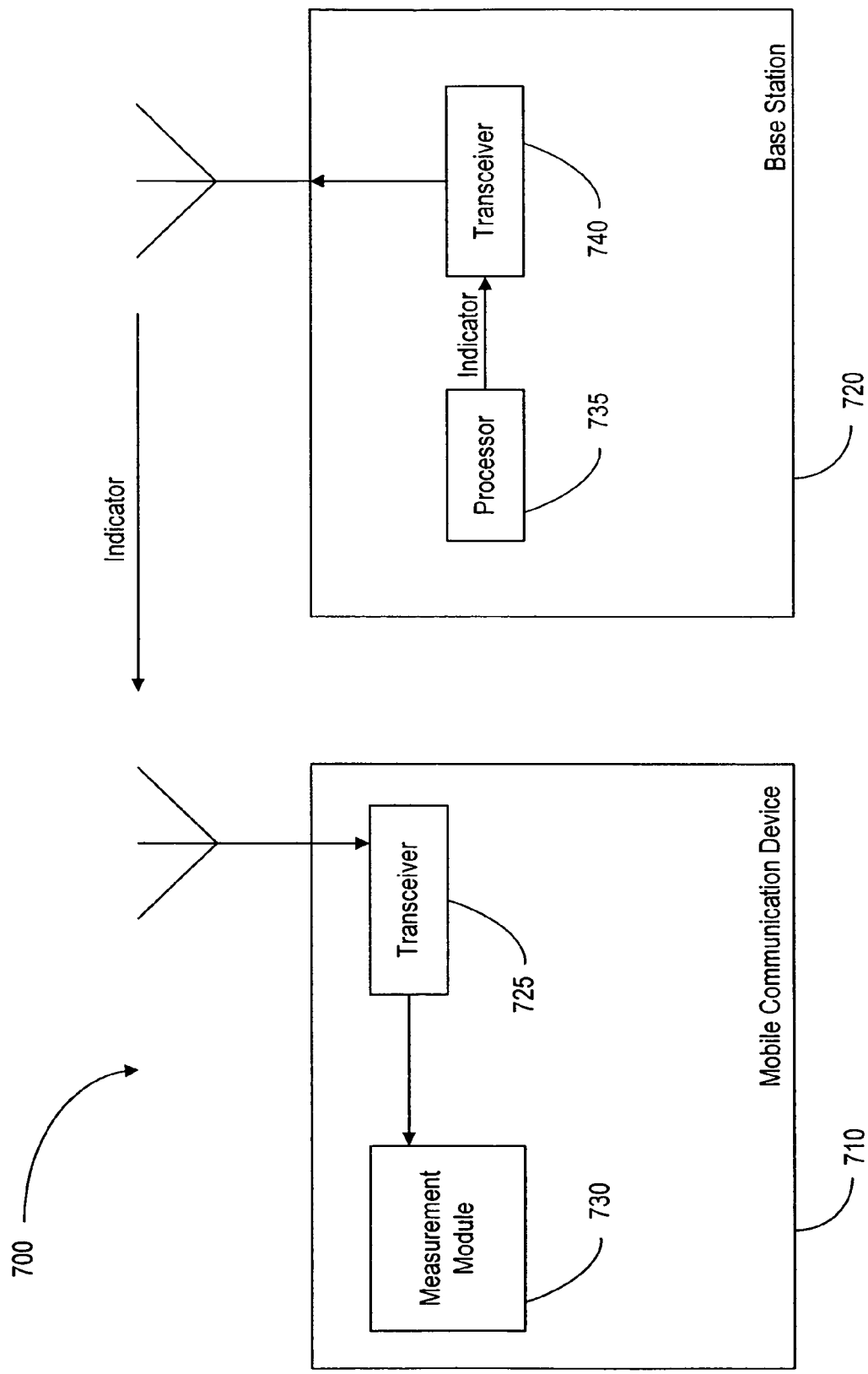
FIG. 7 is a block diagram showing a system according to a embodiment of the present invention.

An embodiment for performing part of this method is shown in FIG. 7. The system 700 includes a mobile communication device 710 and a base station 720. A processor 735 in the base station calculates an indicator indicative of differing allocation in different cells, and provides the indicator to a transceiver 740 which transmits the indicator to the mobile device 710. The mobile device includes a transceiver 725 for receiving the indicator, and a measurement module 730 for performing mobility-related measurements using the indicator.

Several further concepts associated with the present invention will now be briefly described, without in any way limiting what will ultimately be claimed.

An embodiment of the present invention includes a first concept, which is a method comprising: receiving indicators from a plurality of respective cells, each of the indicators being indicative of a difference, if any, regarding allocation between the respective cell and neighbor cells; and, performing measurements according to the indicators and on the basis of configuration of a cell where the measurements are performed.

An embodiment of the present invention also includes the method of the first concept, wherein at least one of the indicators is set automatically using inter-node signaling.

An embodiment of the present invention also includes a third concept, which is a mobile device comprising: a transceiver configured to receive indicators from a plurality of respective cells, each of the indicators being indicative of a difference, if any, regarding allocation between the respective cell and neighbor cells; and, a measuring module configured to perform measurements according to the indicators and on the basis of configuration of a cell where the measurements are performed.

An embodiment of the present invention also includes a fourth concept which is the mobile device of the third concept, wherein at least one of the indicators is set automatically using inter-node signaling.

An embodiment of the present invention also includes a fifth concept, which is a mobile device comprising: means for receiving indicators from a plurality of respective cells, each of the indicators being indicative of a difference, if any, regarding allocation between the respective cell and neighbor cells; and, means for performing measurements according to the indicators and on the basis of configuration of a cell where the measurements are performed.

An embodiment of the present invention also includes a sixth concept which is the mobile device of the fifth concept, wherein at least one of the indicators is set automatically using inter-node signaling.

An embodiment of the present invention includes a seventh concept, which is a computer program product, the computer program product comprising a computer readable medium having executable code stored therein; the code, when executed by a processor, adapted to carry out the steps of: receiving indicators from a plurality of respective cells, each of the indicators being indicative of a difference, if any, regarding allocation between the respective cell and neighbor cells; and, performing measurements according to the indicators and on the basis of configuration of a cell where the measurements are performed.

An embodiment of the present invention also includes an eighth concept, which is the computer program product of the seventh concept, wherein at least one of the indicators is set automatically using inter-node signaling.

Embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor, comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, system, mobile device, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
receiving, at a user equipment in a cell, an indicator representing whether a sub-frame allocation in the cell differs from another sub-frame allocation in one or more neighboring cells; and
performing, at the user equipment, measurements based on at least the received indicator and cell configuration,
wherein the measurements are mobility related neighbor cell measurements, wherein the received indicator defines one or more reference symbols in the sub-frame allocation and the another sub-frame allocation to measure, and wherein the sub-frame allocation comprises at least one of a multicast broadcast single frequency network sub-frame allocation and a unicast sub-frame allocation.

2. The method of claim 1,
wherein a beacon signal is received in discontinuous time periods, the beacon signal having at least two possible phases comprising a first phase in which the beacon signal is received a first number of times over a first time interval, and a second phase in which the beacon signal is received a second number of times over a second time interval, and
wherein the indicator indicates whether at least two cells use a common setting of the at least two possible phases.

3. The method of claim 2, wherein the second number of times form a subset of the first number of times.

4. The method of claim 1, wherein the indicator is set automatically using inter-node signaling.

5. The method of claim 1, wherein the indicator is received via a common channel.

6. The method of claim 5, wherein the common channel comprises a broadcast control channel.

7. The method of claim 1,
wherein the indicator comprises one or more bits, and
wherein the indicator represents whether a multicast broadcast single frequency network is present in the one or more neighboring cells.

8. The method of claim 1,
wherein the measurements comprise beacon signal measurements, and
wherein the indicator is used by a mobile station to determine when the mobile station can reliably make the measurements.

9. The method of claim 8,
wherein the beacon signal comprises a reference signal.

10. An apparatus comprising:
a transceiver configured to receive an indicator representing whether a sub-frame allocation in a cell differs from another sub-frame allocation in one or more neighboring cells; and
a measurement module configured to perform measurements based on at least the received indicator and cell configuration,
wherein the measurements are mobility related neighbor cell measurements, wherein the received indicator defines one or more reference symbols in the sub-frame allocation and the another sub-frame allocation to measure, and wherein the sub-frame allocation comprises at least one of a multicast broadcast single frequency network sub-frame allocation and a unicast sub-frame allocation.

11. The apparatus of claim 10,
wherein a beacon signal is received in discontinuous time periods, the beacon signal having at least two possible phases, including a first phase in which the beacon signal is received a first number of times over a first time interval, and including a second phase in which the beacon signal is received a second number of times over a second time interval, and
wherein the at least one indicator indicates whether at least two cells use a common setting of the at least two possible phases.

12. The apparatus of claim 11,
wherein the second number of times form a subset of the first number of times.

13. The apparatus of claim 10,
wherein the indicator is set automatically using inter-node signaling.

14. The apparatus of claim 10, wherein the indicator is received via a common channel.

15. The apparatus of claim 14, wherein the common channel comprises a broadcast control channel.

16. The apparatus of claim 10,
wherein the indicator comprises one or more bits, and
wherein the indicator represents whether a multicast broadcast single frequency network is present in the one or more neighboring cells.

17. The apparatus of claim 10,
wherein the measurements comprise beacon signal measurements, and
wherein the indicator is used by a mobile station to determine when the mobile station can reliably make the measurements.

18. The apparatus of claim 17,
wherein the apparatus is a mobile station.

19. A non-transitory computer readable medium comprising executable code which when executed by a processor provides operations comprising:
receiving an indicator representing whether a sub-frame allocation in a cell differs from another sub-frame allocation in one or more neighboring cells; and
performing measurements on one or more reference symbols, the measurements performed based on at least the received indicator,
wherein the measurements are mobility related neighbor cell measurements, wherein the received indicator defines one or more reference symbols in the sub-frame allocation and the another sub-frame allocation to measure, and wherein the sub-frame allocation comprises at least one of a multicast broadcast single frequency network sub-frame allocation and a unicast sub-frame allocation.

20. The non-transitory computer readable medium of claim 19,
wherein a beacon signal is received in discontinuous time periods, the beacon signal having at least two possible phases, including a first phase in which the beacon signal is received a first number of times over a first time interval, and including a second phase in which the beacon signal is received a second number of times over a second time interval, and
wherein the at least one indicator includes an indicator that indicates whether at least two cells are using a common setting of the at least two possible phases.

21. The non-transitory computer readable medium of claim 19, wherein the indicator is set automatically using inter-node signaling.

22. The non-transitory computer readable medium of claim 19, wherein the indicator is received via a common channel.

* * * * *